United States Patent
Dai et al.

(10) Patent No.: US 11,995,801 B2
(45) Date of Patent: May 28, 2024

(54) IMAGE PROCESSING METHOD, SYSTEM, DEVICE AND STORAGE MEDIUM

(71) Applicant: SHANGHAI JIAO TONG UNIVERSITY, Shanghai (CN)

(72) Inventors: Wenrui Dai, Shanghai (CN); Ziyang Zheng, Shanghai (CN); Chenglin Li, Shanghai (CN); Junni Zou, Shanghai (CN); Hongkai Xiong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/472,248

(22) Filed: Sep. 22, 2023

(65) Prior Publication Data

US 2024/0029204 A1 Jan. 25, 2024

Related U.S. Application Data

(63) Continuation of application No. PCT/CN2021/120521, filed on Sep. 26, 2021.

(30) Foreign Application Priority Data

Aug. 17, 2021 (CN) .......................... 202110940469.3

(51) Int. Cl.
*G06T 5/60* (2024.01)
*G06T 5/00* (2006.01)
*G06T 5/70* (2024.01)

(52) U.S. Cl.
CPC .................. *G06T 5/60* (2024.01); *G06T 5/00* (2013.01); *G06T 5/70* (2024.01); *G06T 2207/20084* (2013.01)

(58) Field of Classification Search
CPC .... G06T 5/00; G06T 5/60; G06T 5/73; G06T 5/70; G06T 2207/20081; G06T 2207/20084; G06N 3/02–0985
See application file for complete search history.

(56) References Cited

U.S. PATENT DOCUMENTS

2010/0246920 A1 9/2010 Vaswani
2019/0340497 A1* 11/2019 Baraniuk ............... G06N 3/045
(Continued)

FOREIGN PATENT DOCUMENTS

| CN | 110678899 A | 1/2020 |
| CN | 112884851 A | 6/2021 |
| CN | 113034414 A | 6/2021 |

OTHER PUBLICATIONS

Gregor, Karol, and Yann LeCun. "Learning fast approximations of sparse coding." Proceedings of the 27th international conference on international conference on machine learning. 2010. (Year: 2010).*

(Continued)

*Primary Examiner* — Geoffrey E Summers
(74) *Attorney, Agent, or Firm* — True Shepherd LLC; Andrew C. Cheng (57) ABSTRACT

An image processing method for sparse image reconstruction, image denoising, compressed sensing image reconstruction or image restoration, comprising: establishing a general linear optimization inverse problem under the 1-norm constraint of a sparse signal; establishing a differentiable deep network model based on convex combination to solve the problem on the basis of standard or learned iterative soft shrinkage thresholding algorithm; and introducing a deep neural network of arbitrary structure into the solving step to accelerate the solving step and reducing a number of iterations needed to reach a convergence. The present disclosure combines the traditional iterative optimization algorithm with the deep neural network of arbitrary structure to improve the image reconstruction performance and ensure fast convergence to meet the current needs of sparse image reconstruction.

9 Claims, 3 Drawing Sheets

(56) References Cited

U.S. PATENT DOCUMENTS

2020/0349734 A1  11/2020  Wu et al.
2021/0158548 A1   5/2021  Price et al.

OTHER PUBLICATIONS

Mahapatra, Debabrata, Subhadip Mukherjee, and Chandra Sekhar Seelamantula. "Deep sparse coding using optimized linear expansion of thresholds." arXiv preprint arXiv:1705.07290v1 (2017). (Year: 2017).*

Internation Search Report of PCT/CN2021/120521, dated May 12, 2022.

* cited by examiner

S1: acquiring a training image $\hat{y}$, sampling the training image $\hat{y}$ by a sampling matrix $\Phi$ to obtain a measurement signal $b = \Phi\hat{y}$, decomposing the training image $\hat{y}$ into a product of a dictionary $D$ and a sparse signal $\hat{x}$, using the measurement signal $b$ and the sparse signal $\hat{x}$ as a training sample pair $(b, \hat{x})$ to establish a training data set S2: under the 1-norm constraint of the sparse signal $x$ to be solved, establishing a general linear optimization inverse problem:

$$\min_{x} F(x) = \min_{x} \left\{ \frac{1}{2} \parallel Ax - b \parallel_{2}^{2} + \lambda \parallel x \parallel_{1} \right\}$$

$x$ being a sparse signal to be solved, $A = \Phi D$ being a linear transformation matrix, $\Phi$ being a sampling matrix, $D$ being a dictionary, $\lambda$ being a parameter of a constraint regularization term, and $\parallel \cdot \parallel_{1}$ being the 1-norm of a vector S3: using a standard iterative soft shrinkage thresholding algorithm or a learned iterative soft shrinkage thresholding algorithm to solve the above-mentioned linear optimization inverse problem, establishing a differentiable deep network model based on a convex combination, using a training sample pair $(b, \hat{x})$ in a training data set, taking a measurement signal $b$ as an input of the differentiable deep network model and a sparse signal $\hat{x}$ as a target of the differentiable deep network model, using a backpropagation algorithm to optimize the differentiable deep network model, obtaining $x$ and approximating $x$ to the sparse signal $\hat{x}$, obtaining a reconstructed image $y = Dx$ and approximating $y = Dx$ to a training image $\hat{y}$

IMAGE PROCESSING METHOD, SYSTEM, DEVICE AND STORAGE MEDIUM

CROSS-REFERENCE TO RELATED APPLICATIONS

This application is a continuation of International Patent Application No. PCT/CN2021/120521 with a filing date of Sep. 26, 2021, designating the United States, now pending, and further claims priority to Chinese Patent Application No. 202110940469.3 with a filing date of Aug. 17, 2021. The content of the aforementioned applications, including any intervening amendments thereto, are incorporated herein by reference.

TECHNICAL FIELD

The present disclosure relates to the field of signal processing, and in particular, to an image processing method, system, apparatus and storage medium.

BACKGROUND ART

With the development of media technology, mass data are bringing harsh challenges in real-time transmission, analysis and storage. For example, a large number of applications of media images have been developed in various aspects, and higher requirements for image resolution and imaging speed have been put forward. Sparse image reconstruction can solve the problems of loss of part of image signals in the compression process and low image compression efficiency due to large amount of image information, so as to reconstruct the image required by applications.

In view of the technical requirements, some researchers have proposed solutions, such as Chinese patent CN201611029446.2 and CN106780636 A, which proposes a method and device for sparse reconstruction of an image. According to the theory of compressed sensing of a signal, the reconstruction problem of an image is converted into an optimization problem, and the object to be optimized in the optimization problem is determined via the compression matrix of the image, and the optimization object is optimized for multiple times. According to the optimization result, a sparse coefficient matrix of the image is obtained, and the reconstructed image is obtained, so that not only the reconstruction of the image is realized, but by improving the convergence speed and convergence ability of the whole optimization process, the consumption of hardware and software resources in the image reconstruction process is effectively reduced, and the reconstruction efficiency and precision of the image are improved. As another example, Chinese patent applications CN201811059265.3 and CN109345453 A disclose a system and method for image super-resolution reconstruction using sparse regularization of a standardization group, using a bilinear interpolation method to obtain an initial estimation value of image super-resolution reconstruction, then, by using the normalized sparse prior of the group of image patches, the adaptive soft threshold filtering in PCA domain and the regularized least squares in pixel domain of the image block group are iterated several times to effectively improve the quality of reconstruction in image super-resolution.

Traditional iterative optimization methods usually have convergence guarantee. However, the optimization structure is too rigid, and the performance is greatly poor compared with deep neural networks (DNNs). With the development of DNNs, there are more and more applications of DNNs.

For example, Chinese patent applications CN202110108699.3 and CN112884851 A disclose a method for deep compressed sensing network by unfolding an iterative optimization algorithm. The deep compressed sensing network is applied to adaptive compressed sampling of an image at the encoder side and guides the structure design of a deep neural network at the decoder end using an optimization algorithm so as to accurately reconstruct an original image. The reconstruction network module is divided into two parts: a first part unfolding a fast iterative shrink threshold algorithm (FISTA) into a deep neural network form, and a second part using a set of convolution filters and nonlinear activation functions to reduce block artifacts caused by block compressed sensing.

In recent years, some scholars combined deep learning and traditional iterative optimization methods to design interpretable differentiable deep neural network model under the guidance of optimization theory. However, the current differentiable neural networks cannot take into account both model flexibility and theoretical convergence, and some of the methods with theoretical convergence have strict dimensional and operational constraints on the introduced network parameters, while the method allowing the introduction of flexible network parameters cannot demonstrate the convergence of the method from the perspective of optimization. Therefore, it is difficult to meet the current demand for sparse reconstruction of images.

SUMMARY OF THE INVENTION

In view of the deficiencies of the prior art, the present disclosure provides an image processing method, system, device and storage medium, wherein an unrestricted network learning parameter is introduced on the basis of an iterative soft shrinkage thresholding algorithm, and an image required by an application can be reconstructed to meet the current requirements of sparse image reconstruction.

According to a first aspect of the present disclosure, there is provided an image processing method for sparse image reconstruction, image denoising, compressed sensing image reconstruction reconstruction or image restoration, comprising:
  acquiring a training image, and processing the training image to obtain a measurement signal;
  decomposing the training image into a product of a dictionary and a sparse signal, taking the measurement signal and the sparse signal as a training sample pair, and establishing a training data set;
  establishing a linear inverse problem of image processing under the 1-norm constraint; solving the linear inverse problem by using an iterative soft shrinkage thresholding algorithm, and establishing a differentiable deep neural network with a convex combination according to a convex combination of the iterative soft shrinkage thresholding algorithm and the deep neural network; and using the training sample pair in the training data set, taking the measurement signal as an input of the differentiable deep network model, and taking the sparse signal as a target of the differentiable deep network model, using the backpropagation algorithm to optimize the differentiable deep network model, obtaining a reconstructed sparse signal, and approximating the reconstructed sparse signal to the sparse signal to obtain a final image, the final image being a product of the dictionary and the reconstructed sparse signal, and approximating the final image to the training image.

Optionally, processing the training image to obtain a measurement signal comprises any one of the following:

when the image processing is sparse image reconstruction: acquiring a training image ŷ, sampling the training image ŷ by a sampling matrix Φ to obtain the measurement signal b=Φŷ.

when the image processing is image denoising: acquiring a training image ŷ, adding the training image ŷ to a noise matrix to obtain a measurement signal ḃ, the measurement signal ḃ being a noisy image;

when the image processing is compressed sensing image reconstruction: acquiring a training image ŷ, multiplying the training image ŷ by a random sampling matrix Φ̂ to obtain a measurement signal b̂=Φ̂ŷ, the measurement signal b̂ being a sampling value; and when the image processing is image restoration: acquiring a training image ŷ, multiplying the training image ŷ by a 0-1 diagonal sampling matrix Φ̃ to obtain a measurement signal b̃=Φ̃ŷ, the measurement signal being an image to be restored by a missing pixel point, and the 0-1 diagonal sampling matrix Φ̃ being a diagonal matrix, and the diagonal element being either 0 or 1.

Optionally, the establishing a linear inverse problem of image processing under the 1-norm constraint comprises any one of the following:

when the image processing is sparse image reconstruction: under the norm regular constraint of a reconstructed sparse signal x, establishing a general linear optimization inverse problem:

$$\min_x F(x) = \min_x \left\{ \frac{1}{2} \|Ax - b\|_2^2 + \lambda \|x\|_1 \right\},$$

x being a reconstructed sparse signal, A=ΦD being a linear transformation matrix, Φ being a sampling matrix, D being a dictionary, λ being a parameter of a constraint regularization term, and $\|\cdot\|_1$ being the 1-norm of a vector;

when the image processing is image denoising: under the 1-norm constraint, establishing a linear inverse problem of image denoising:

$$\min_x \left\{ \frac{1}{2} \|\dot{A}x - \dot{b}\|_2^2 + \lambda \|x\|_1 \right\},$$

x being the reconstructed sparse signal, and linear transformation matrix Ȧ being the dictionary D, namely Ȧ=D, λ being a parameter of the constraint regularization term, and $\|\cdot\|_1$ being the 1-norm of a vector;

when the image processing is compressed sensing image reconstruction: under the 1-norm constraint, establishing the linear inverse problem of compressed sensing image reconstruction:

$$\min_x \left\{ \frac{1}{2} \|\hat{A}x - \hat{b}\|_2^2 + \lambda \|x\|_1 \right\},$$

x being the reconstructed sparse signal, and the linear transformation matrix Â being a product of a random sampling matrix Φ̂ and a dictionary D, namely Â=Φ̂D, λ being a parameter of a constraint regularization term and $\|\cdot\|_1$ being the 1-norm of a vector; and when the image processing is image restoration: under the 1-norm constraint, establishing the linear inverse problem of image restoration;

$$\min_x \left\{ \frac{1}{2} \|\tilde{A}x - \tilde{b}\|_2^2 + \lambda \|x\|_1 \right\},$$

x being the reconstructed sparse signal, and the linear transformation matrix Ã being a product of a 0-1 diagonal sampling matrix Φ̃ and a dictionary D, namely Ã=Φ̃D, λ being a parameter of a constraint regularization term, and $\|\cdot\|_1$ being the 1-norm of a vector.

Optionally, the solving the linear inverse problem by using an iterative soft shrinkage thresholding algorithm comprises solving the linear inverse problem using a standard iterative soft shrinkage thresholding algorithm or solving the linear inverse problem using a learned iterative soft shrinkage thresholding algorithm the solving the linear inverse problem using a standard iterative soft shrinkage thresholding algorithm specifically being: $x^{n+1} = \text{prox}_{\|\cdot\|_1, \lambda t^n}(t^n A^T b + (I - t^n A^T A) x^n)$, $x^n$ representing a sparse signal obtained by solving the linear inverse problem at nth iteration, $A^T$ representing a transpose of a matrix A, I representing an identity matrix, and $t^n$ representing a step size at n th iteration; $\text{prox}_{\|\cdot\|_1, \lambda t^n}$ representing a proximal projection operator under the 1-norm constraint $\|\cdot\|_1$ and a hyperparameter $\lambda t^n$, specifically expressed as solving an optimization problem:

$$\text{prox}_{\|\cdot\|_1, a}(x) = \arg\min_r \left\{ \frac{1}{2} \|r - x\|_2^2 + a \|r\|_1 \right\},$$

r being an objective variable for solving the optimization problem represented by the proximal projection operator, a being a threshold parameter; and the solving the linear inverse problem using a learned iterative soft shrinkage thresholding algorithm specifically being: $x^{n+1} = \text{prox}_{\|\cdot\|_1, \theta^n}(x^n + (W^n)^T (b - Ax^n))$, $x^n$ representing a reconstructed sparse signal obtained by solving the linear inverse problem at nth iteration, $W^n$ representing a coefficient matrix obtained by training a neural network at nth iteration, and $\theta^n$ representing a threshold parameter at nth iteration.

Optionally, the establishing a differentiable deep network model based on a convex combination comprises:

initializing to obtain a sparse signal $x^0$ when there is no iteration, according to a convex combination of an iterative soft shrinkage thresholding algorithm and a deep neural network, constructing a differentiable deep network model composed of K convex combination blocks, respectively corresponding to the n=1th iteration to n=K th iteration of the iterative soft shrinkage thresholding algorithm, taking an output $x^{n-1}$ of the n−1th block as an input to the nth block, and updating and obtaining an output $x^n$, n=1, . . . , K corresponding to the nth block via the convex combination block.

Optionally, a loss function of the differentiable deep network model is defined as a mean square error $L_{MSE}$ of a sparse signal reconstruction error in the training data set:

$$L_{MSE} = \frac{1}{N} \sum_{i=1}^{N} \|\hat{x}_i - x_i\|_2^2;$$

in the equation, N being a number of sparse signals in the training data set, $\hat{x}_i$ being ith signal in the training data set, $x_i$ being the reconstructed sparse signal obtained from a measurement signal $b_i$ of ith signal $\hat{x}_i$ by the deep neural network.

Optionally, the taking an output $x^{n-1}$ of the n−1th block as an input to the nth block, and updating and obtaining an output $x^n$ corresponding to the nth block via the convex combination block comprises:

first proximal projection: solving on the basis of the iterative soft shrinkage thresholding algorithm and outputting a first proximal projection $v^n$ according to the input $x^{n-1}$;

deep neural network mapping: inputting the first proximal projection $v^n$, performing mapping via the deep neural network, outputting $u^n$, and calculating as $u^n = \mathcal{N}_{P^n}(v^n)$, $\mathcal{N}_{P^n}$ representing the deep neural network introduced during nth iteration, and $P^n$ representing a network parameter which needs to be obtained by neural network training;

second proximal projection: solving on the basis of the iterative soft shrinkage thresholding algorithm and outputting the second proximal projection $w^n$ according to the input $u^n$; and convex combination calculation: inputting the first proximal projection $v^n$ and the second proximal projection $w^n$, and outputting the result $x^n$ of the nth iteration, the calculation step being $x^n = \alpha^n v^n + (1-\alpha^n) w^n$, $\alpha^n$ being a convex combination parameter between 0 and 1 which needs to be obtained by neural network training.

According to a second aspect of the disclosure, there is provided an image processing system comprising:

a training data set establishment module: acquiring a training image, and processing the training image to obtain a measurement signal; decomposing the training image into a product of a dictionary and a sparse signal, taking the measurement signal and the sparse signal as a training sample pair, and establishing a training data set;

a differentiable deep neural network establishment module: establishing a linear inverse problem of image processing under the 1-norm constraint, solving the linear inverse problem by using an iterative soft shrinkage thresholding algorithm, and establishing a differentiable deep neural network with a convex combination according to a convex combination of the iterative soft shrinkage thresholding algorithm and the deep neural network; and a processing module: using the training sample pair in the training data set, taking the measurement signal as an input of the differentiable deep network model, and taking the sparse signal as a target of the differentiable deep network model, using the backpropagation algorithm to optimize the differentiable deep network model, obtaining a reconstructed sparse signal, and approximating the reconstructed sparse signal to the sparse signal to obtain a final image, the final image being a product of the dictionary and the reconstructed sparse signal, and approximating the final image to the training image.

According to a third aspect of the present disclosure, there is provided an image processing device comprising a memory, a processor and a computer program stored on the memory and executable on the processor, the processor being operative to perform the image processing method described above when executing the computer program.

According to a fourth aspect of the present disclosure, there is provided a computer readable storage medium having stored thereon a computer program which, when being executed by a processor, is operable to perform the above-mentioned image processing method.

According to a fifth aspect of the present disclosure, there is provided a computer program product comprising a non-transitory computer readable storage medium storing a computer program operable to cause a computer to perform the image processing method.

According to a sixth aspect of the present disclosure, there is provided a chip system comprising a processor coupled to a memory, the memory storing program instructions which, when executed by the processor, perform the image processing method.

According to a seventh aspect of the present disclosure there is provided a computer apparatus comprising:

a communication interface;

a memory for storing a program for implementing the image processing method;

a processor for loading and executing a program stored in the memory so as to implement the various steps of the image processing method.

The present disclosure has at least one of the following advantages over the prior art.

The image processing method, device and storage medium provided by the present disclosure can interpret the network architecture from an optimization point of view and ensure the convergence of network training, while ensuring the reconstruction accuracy compared with the standard deep neural network method.

The image processing method, device and storage medium provided by the present disclosure, compared with the existing differentiable deep neural network method, ensure the convergence of network training, and at the same time do not limit the introduced neural network structure, and have a higher reconstruction accuracy.

The image processing method, device and storage medium provided by the present disclosure improve the operation speed and reconstruction accuracy compared with the traditional iterative optimization algorithm.

BRIEF DESCRIPTION OF THE DRAWINGS

Other features, objects and advantages of the disclosure will become more apparent from reading the detailed description of non-limiting embodiments with reference to the following drawings:

FIG. 1 is a flowchart of a sparse image reconstruction method based on a deep neural network according to a preferred embodiment of the present disclosure;

DETAILED DESCRIPTION OF THE INVENTION

Hereinafter, the present disclosure will be described in detail with reference to specific examples. The following examples will aid those skilled in the art in further understanding of the present disclosure, but do not limit the disclosure in any way. It should be noted that several variations and modifications can be made by a person skilled in the art without departing from the inventive concept. These are all within the scope of the present disclosure. Portions not described in detail below may be implemented using conventional techniques.

An image processing method provided by an embodiment of the present disclosure can be used for sparse image reconstruction, image denoising, compressed sensing image reconstruction or image restoration, wherein a general linear optimization inverse problem is established under the 1-norm regular constraint of a sparse signal. On the basis of the iterative soft shrinkage thresholding algorithm, a differentiable deep network model based on convex combination is established to solve the problem. The deep neural network with arbitrary structure is introduced into the solving step to accelerate the solving step and reduce the number of iterations needed to reach the convergence. When the sparse image reconstruction is performed, a differentiable deep network model based on convex combination is a differentiable deep network model based on iterative soft shrinkage thresholding algorithm to solve the general linear inverse problem, and a free-structure deep neural network is allowed to improve the performance, which can recover the sparse signal from the measurement signal of the image and reconstruct the image according to the sparse signal. The image denoising, compressed sensing image reconstruction and image restoration methods in other embodiments can be seen as specific applications of this sparse image reconstruction method as a generalization method, and they differ in that different measurement signals, sampling matrix and linear transformations are defined according to different applications, and different training sets are formed to train a differentiable deep network model for corresponding image denoising, compressed sensing image reconstruction and image restoration applications.

FIG. 1 is a flowchart of a sparse image reconstruction method based on a deep neural network according to a preferred embodiment of the present disclosure.

As shown in FIG. 1, the sparse image reconstruction method provided by the preferred embodiment may comprise the following steps:

S1, acquiring a training image $\hat{y}$, sampling the training image $\hat{y}$ by a sampling matrix $\Phi$ to obtain a measurement signal $b=\Phi\hat{y}$, decomposing the training image $\hat{y}$ into a product of a dictionary D and a sparse signal $\hat{x}$, taking the measurement signal b and the sparse signal $\hat{x}$ as a training sample pair (b, $\hat{x}$), and establishing a training data set.

A measurement signal is a signal that can actually be observed or measured. During training, the training image is known and the measurement signal is obtained by sampling the training image. Specifically, the specific meaning of the measurement signal is different in different tasks. For example, in image denoising the measurement signal is an actually obtained noisy image, in image restoration the measurement signal is an image to be restored by missing pixels, and in compressed sensing reconstruction the measurement signal is a measured sampling value.

S2, under the 1-norm constraint of a reconstructed sparse signal x, establishing a general linear optimization inverse problem:

$$\min_x F(x) = \min_x \left\{ \frac{1}{2}\|Ax - b\|_2^2 + \lambda\|x\|_1 \right\},$$

x being reconstructed sparse signal, $A=\Phi D$ being a linear transformation matrix, $\Phi$ being a sampling matrix, D being a dictionary, $\lambda$ being a parameter of a constraint regularization term, and $\|\cdot\|_1$ being the 1-norm of a vector.

S3, using a standard iterative soft shrinkage thresholding algorithm or using a learned iterative soft shrinkage thresholding algorithm to solve the above-mentioned linear optimization inverse problem, establishing a differentiable deep network model based on a convex combination, using a training sample pair (b, $\hat{x}$) in a training data set, taking a measurement signal b as an input of the differentiable deep network model and a sparse signal $\hat{x}$ as a target of the differentiable deep network model, using the backpropagation algorithm to optimize the differentiable deep network model, obtaining x and approximating x to the sparse signal $\hat{x}$, obtaining a reconstructed image $y=Dx$ and approximating y to a training image $\hat{y}$.

In this embodiment, reconstructed sparse signal x is the output of the differentiable deep network model. The sparse signal $\hat{x}$ comes directly from the training image $\hat{y}$ and is only used to train the differentiable deep network model.

Compared with the image reconstruction method of standard deep neural network, the above-mentioned embodiments of the present disclosure can guarantee the reconstruction accuracy, and, at the same time, can interpret the network architecture from the perspective of optimization, and guarantee the convergence of network training.

Figure 2:
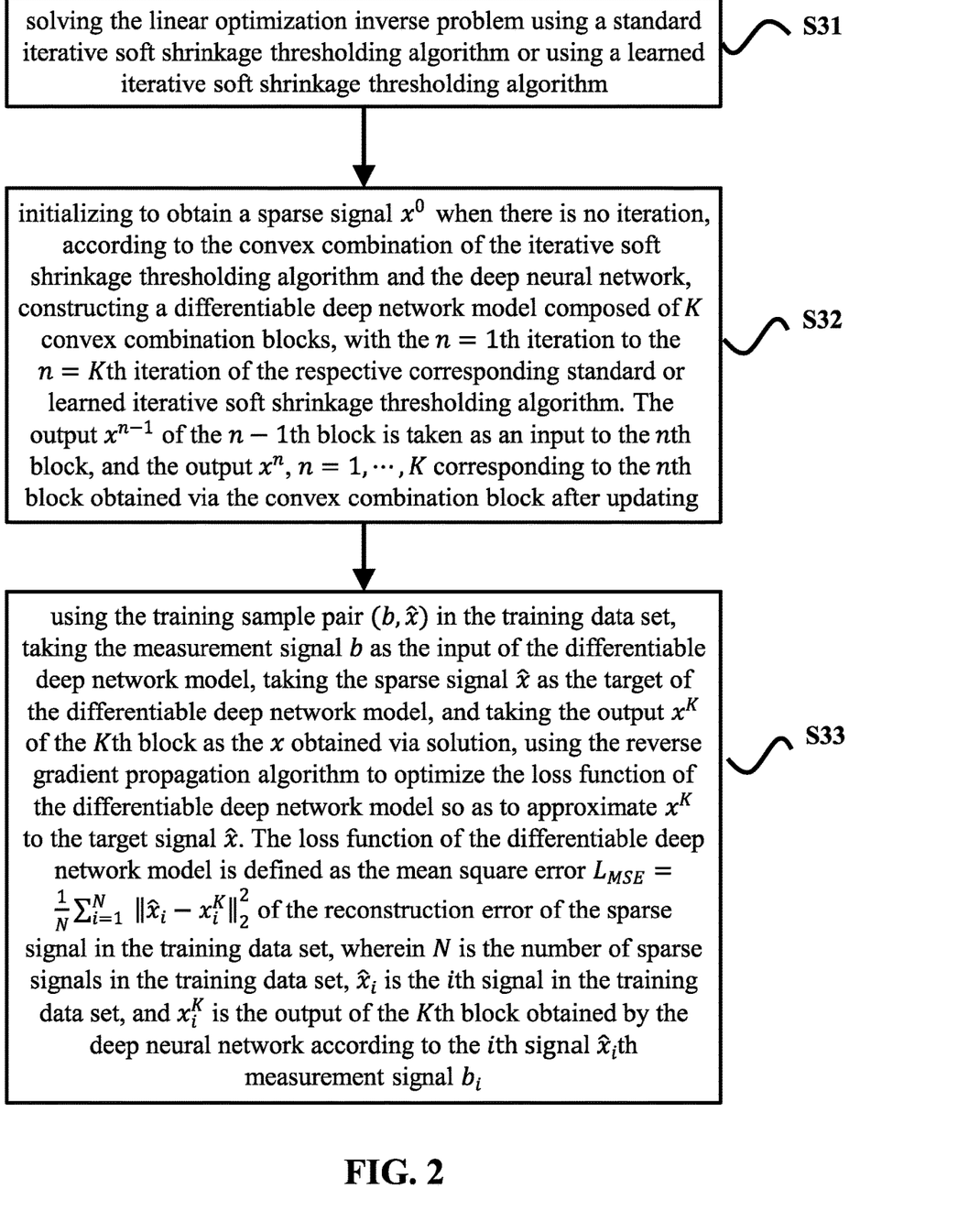
FIG. 2 is a flowchart for establishing a network model for solving a linear inverse problem according to a preferred embodiment of the present disclosure.

As shown in FIG. 2, as a preferred embodiment, S3 may comprise the following steps:

S31, solving the linear optimization inverse problem using a standard iterative soft shrinkage thresholding algorithm or using a learned iterative soft shrinkage thresholding algorithm.

Specifically,

A standard iterative soft shrinkage thresholding algorithm is used to solve a linear inverse problem, specifically: $x^{n+1} = \text{prox}_{\|\cdot\|_1, \lambda t^n}(t^n A^T b + (I - t^n A^T A)x^n)$, $x^n$ representing the sparse signal obtained by solving the linear inverse problem at the nth iteration, $A^T$ representing the transpose of the matrix A, I representing the identity matrix, and $t^n$ representing the step size at the nth iteration; $\text{prox}_{\|\cdot\|_1, \lambda t^n}$ representing a proximal projection operator under the 1-norm constraint $\|\cdot\|_1$ and a hyperparameter $\lambda t^n$, specifically expressed as solving an optimization problem:

$$\text{prox}_{\|\cdot\|_1, a}(x) = \arg\min_r \left\{ \frac{1}{2}\|r - x\|_2^2 + a\|r\|_1 \right\},$$

wherein r represents a solution target in the above-mentioned optimization problem, and a represents a threshold parameter.

The linear inverse problem is solved using a learned iterative soft shrinkage thresholding algorithm, specifically: $x^{n+1} = \text{prox}_{\|\cdot\|_1, \theta^n}(x^n + (W^n)^T(b - Ax^n))$, wherein $x^n$ represents a sparse signal obtained by solving the linear inverse problem at the nth iteration, $W^n$ represents a coefficient matrix obtained by training a neural network at the nth iteration, and $\theta^n$ represents a threshold parameter at the nth iteration.

S32, initialization is performed to obtain a sparse signal $x^0$ when there is no iteration, and according to the convex combination of the iterative soft shrinkage thresholding algorithm and the deep neural network, a differentiable deep network model composed of K convex combination blocks is constructed, with the n=1th or n=Kth iteration of the respective corresponding standard or learned iterative soft shrinkage thresholding algorithm. An output $x^{n-1}$ of the n−1th block is taken as an input to the nth block, and a corresponding output $x^n$, n=1, ..., K of the nth block is obtained after updating via the convex combination block.

As a preferred embodiment, S32 constructs a corresponding differentiable deep neural network model according to the iterative soft shrinkage thresholding algorithm selected in S31, which can achieve the same accuracy with less time complexity and computational complexity compared with the traditional iterative optimization algorithm, which, compared with the standard deep neural network model, has theoretical convergence and interpretability based on optimization theory.

Figure 3:
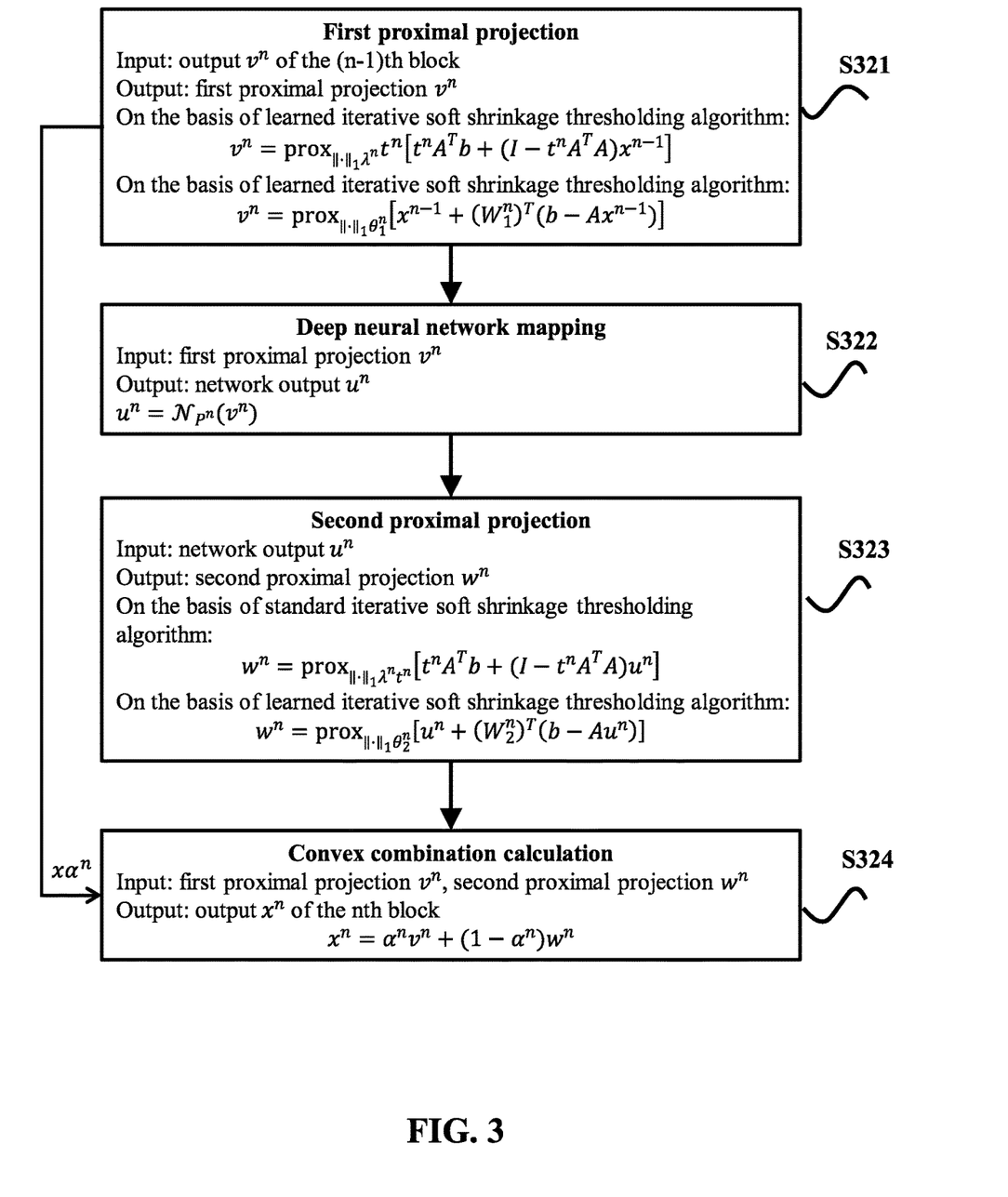
FIG. 3 is a schematic view showing a design method of the n th convex combination block (n=1, . . . , K) according to a preferred embodiment of the present disclosure.

As shown in FIG. 3, in this process, as a preferred embodiment, an output $x^{n-1}$ of the n−1th block is taken as an input to the nth block, and a corresponding output $x^n$ of the nth block is obtained after updating via the convex combination block can comprise the following steps:

S321, first proximal projection: inputting $x^{n-1}$, solving on the basis of a standard or learned iterative soft shrinkage thresholding algorithm, and outputting a first proximal projection $x^{n-1}$, when it is based on a standard iterative soft shrinkage thresholding algorithm, the calculation steps being $v^n = \text{prox}_{\|\cdot\|_1 \lambda^n t^n}[t^n A^T b + (I - t^n A^T A)x^{n-1}]$, where $\lambda^n$ and $t^n$ respectively represent the parameters and the step size of the constraint regularization term obtained by neural network training in the nth iteration, when it is based on the learned iterative soft shrinkage thresholding algorithm, the calculation step is $v^n = \text{prox}_{\|\cdot\|_1 \theta_1^n}[x^{n-1} + (W_1^n)^T(b - Ax^{n-1})]$, where $W_1^n$ represents the coefficient matrix that needs to be trained by the neural network at the nth iteration.

S322, deep neural network mapping: inputting a first proximal projection $v^n$, performing mapping via a deep neural network, and outputting $u^n$, wherein the calculation step is $u^n = \mathcal{N}_{P^n}(v^n)$, $\mathcal{N}_{P^n}$ representing the deep neural network introduced in the nth iteration, and $P^n$ representing the network parameter which need to be obtained by neural network training.

As a preferred embodiment, the structure of the deep neural network in S322 is the same in each convex combination block, and any composition structure can be applied, including but not limited to a convolution layer, a full connection layer, a non-linear activation layer, a pooling layer, a batch normalization layer, a skip connection, etc. The learnable parameters are obtained by learning the mean square error of the sparse signal reconstruction minimized by the back-propagation algorithm, which can accelerate the convergence of the algorithm, so that the algorithm can achieve the same accuracy with less time complexity and computational complexity compared with the traditional or learned iterative soft shrinkage thresholding algorithm.

S323, second proximal projection: inputting $u^n$, solving based on a standard or learned iterative soft shrinkage thresholding algorithm, and outputting a second proximal projection $w^n$. When it is based on the standard iterative soft shrinkage thresholding algorithm, the calculation step is $w^n = \text{prox}_{\|\cdot\|_1 \lambda^n t^n}[t^n A^T b + (I - t^n A^T A)u^n]$. When it is based on the learned iterative soft shrinkage thresholding algorithm, the calculation step is $w^n = \text{prox}_{\|\cdot\|_1 \theta_2^n}[u^n + (W_2^n)^T(b - Au^n)]$, where $W_2^n$ represents the coefficient matrix that needs to be trained by the neural network at the nth iteration.

S324, convex combination calculation: inputting the first proximal projection $v^n$ and the second proximal projection $w^n$, and outputting the result $x^n$ of the nth iteration, wherein the calculation step is $\alpha^n$ being a convex combination parameter of either 0 or 1 required to be obtained by neural network training.

S33, using the training sample pair $(b, \hat{x})$ in the training data set, taking the measurement signal b as the input of the differentiable deep network model, taking the sparse signal $\hat{x}$ as the target of the differentiable deep network model, and taking the output $x^K$ of the Kth block as the x obtained by solution, using the reverse gradient propagation algorithm to optimize the loss function of the differentiable deep network model so as to approximate $x^K$ to the target signal $\hat{x}$. The loss function of the differentiable deep network model is defined as the mean square error $$L_{MSE} = \frac{1}{N} \sum_{i=1}^{N} \|\hat{x}_i - x_i^K\|_2^2$$

of the reconstruction error of the sparse signal in the training data set, wherein N is the number of sparse signals in the training data set, $\hat{x}_i$ is the ith signal in the training data set, and $x_i^K$ is the output of the Kth block obtained by the deep neural network according the measurement signal $b_i$ of ith signal $\hat{x}_i$.

In the above-mentioned embodiment, S33 uses the end-to-end network training to obtain the network parameters with optimal performance, and can adaptively update to obtain a higher reconstruction performance compared with the hyperparameters which need to be manually selected in the traditional iterative optimization algorithm.

In the above-mentioned embodiments, S3 introduces a deep neural network model with any reasonable and feasible structure, and constructs a differentiable deep neural network based on convex combination, which can achieve the same accuracy with less time complexity and computational complexity compared with the traditional iterative optimization algorithm. Compared with the standard deep neural network model, it has theoretical convergence and interpretability based on optimization theory.

In the above-mentioned embodiments of the present disclosure, the deep neural network structure used by the convex combination block is the same, and the learnable parameters are obtained by learning the mean square error of the sparse signal reconstruction minimized by the back propagation algorithm, so that the convergence of the algorithm can be accelerated, and the algorithm can achieve the same accuracy with less time complexity and computational complexity compared with the traditional or learned iterative soft shrinkage thresholding algorithm. The deep neural network used by the convex combination blocks may be applied to any building structure including, but not limited to, a convolution layer, a fully connected layer, a non-linear activation layer, a pooling layer, a batch normalization layer, a skip connection, etc.

The sparse image reconstruction method based on deep neural network provided by the above-mentioned embodiments of the present disclosure can be applied to solving general linear inverse problem and relevant practical application scenarios, such as image denoising, compressed sensing, image restoration, etc. For a better understanding, the technical solutions provided by the above-mentioned embodiments of the present disclosure are described in further detail below in connection with specific application examples.

In this specific application example, sparse signal reconstruction is realized, and a specific sparse image reconstruction method based on a deep neural network comprises the following three main steps.

In step 1, several sparse training images $\hat{y}$ of dimension 500 are obtained. Since $\hat{y}$ has sparsity, the dictionary D can be made equal to the identity matrix, and the training image ŷ is equal to the sparse signal x̂. The training image ŷ is sampled by a sampling matrix Φ with a given dimension being (250, 500) to obtain a measurement signal b=Φŷ, taking the measurement signal b and the sparse signal x̂ as a training sample pair (b, x̂), and establishing a training data set Γ;

In step 2, under the 1-norm constraint of reconstructed sparse signal x, a general linear optimization inverse problem is established:

$$\min_x F(x) = \min_x \left\{ \frac{1}{2}\|Ax - b\|_2^2 + \lambda\|x\|_1 \right\},$$

x being the reconstructed sparse signal, with linear transformation matrix A and sampling matrix Φ being equal, λ the parameter of constraint regularization term, and $\|\cdot\|_1$ being the 1-norm of vector.

In step 3, a learned iterative soft shrinkage thresholding algorithm is used to solve the above-mentioned linear optimization inverse problem, a differentiable deep network model based on the convex combination is established, a training sample pair (b, x̂) in a training data set is used, a measurement signal b is taken as an input of the differentiable deep network model and a sparse signal x̂ is taken as a target of the differentiable deep network model, and the backpropagation algorithm is taken to optimize the differentiable deep network model, x is obtained and approximated to the sparse signal x̂, and the reconstructed image y=x is obtained and y is approximated to the training image ŷ.

In step 3, the above-mentioned linear optimization inverse problem is solved using a learned iterative soft shrinkage thresholding algorithm, and specifically: $x^{n+1}=\text{prox}_{\|\cdot\|_1\theta^n}(x^n+(W^n)^T(b-Ax^n))$, wherein $x^n$ represents a sparse signal obtained by solving a linear inverse problem at the nth iteration, $W^n$ represents a coefficient matrix obtained by training a neural network at the nth iteration, and $\theta^n$ represents a threshold parameter at the nth iteration.

In step 3, a differentiable deep network model based on a convex combination is established, specifically: the sparse signal $x^0$ without iteration is obtained by initialization, and according to the convex combination of iterative soft shrinkage thresholding algorithm and deep neural network, a differentiable deep network model composed of 16 convex combination blocks is constructed, corresponding to the n=1th iteration to the n=16th iteration of standard or learned iterative soft shrinkage thresholding algorithm respectively. The output $x^{n-1}$ of the n−1th block is taken as an input to the nth block, and a corresponding output $x^n$, n=1, . . . , 16 of the nth block obtained after updating via the convex combination block.

The fact that the output $x^{n-1}$ of the n−1th block is taken as an input to the n th block, and the output $x^n$ corresponding to the n th block is obtained after updating via the convex combination block as described above specifically comprises the following steps:

S321, first proximal projection: inputting $x^{n-1}$, on the basis of the learned iterative soft shrinkage thresholding algorithm, outputting $v^n=\text{prox}_{\|\cdot\|_1\theta_1^n}[x^{n-1}+(W_1^n)^T(b-Ax^{n-1})]$, wherein $W_1^n$ represents a coefficient matrix which needs to be obtained by neural network training at the nth iteration.

S322, deep neural network mapping: inputting a first proximal projection $v^n$, performing mapping via a deep neural network, and outputting $u^n$, wherein the calculation step is $u^n=\mathcal{N}_{P^n}(v^n)$, $\mathcal{N}_{P^n}$ representing the deep neural network introduced in the nth iteration, and $P^n$ representing network parameters which need to be obtained by neural network training.

As a specific application example, the introduced deep neural network contains three convolution layers with dimensions (9, 1, 16), (9, 16, 16), (9, 16, 1), where the meaning of the dimension is (the size of the convolution kernel, the feature dimension of the input signal, the feature dimension of the output signal). Each convolution layer is followed by a non-linear activation unit ReLU. The input signal of the first convolution layer and the output signal of the third convolution layer are additively connected.

S323, second proximal projection: inputting $u^n$, on the basis of the learned iterative soft shrinkage thresholding algorithm, outputting $w^n=\text{prox}_{\|\cdot\|_1\theta_2^n}[u^n+(W_2^n)^T(b-Au^n)]$, wherein $W_2^n$ represents a coefficient matrix which needs to be obtained by neural network training at the nth iteration.

S324, convex combination calculation: inputting the first proximal projection $v^n$ and the second proximal projection $w^n$, and outputting the result $x^n$ of the nth iteration, wherein the calculation step is $x^n=\alpha^n v^n+(1-\alpha^n)w^n$, $\alpha^n$ being a convex combination parameter of either 0 or 1 which needs to be obtained by neural network training.

Using a training sample pair (b, x̂) in a training data set, taking a measurement signal b as an input of a differentiable deep network model and a sparse signal x̂ as a target of the differentiable deep network model, and solving a linear optimization inverse problem according to a linear transformation matrix A=Φ in step 3 specifically comprises: using the training sample pair (b, x̂) in the training data set, taking the measurement signal b as the input of the differentiable deep network model and the sparse signal x̂ as the target of the differentiable deep network model, and taking the output $x^{16}$ of the 16th block as the x obtained via solution, using the inverse gradient propagation algorithm to optimize the loss function of the differentiable deep network model and approximating $x^{16}$ to the target signal x̂. The loss function of the differentiable deep network model is defined as the mean square error $$L_{MSE} = \frac{1}{N}\sum_{i=1}^{N}\|\hat{x}_i - x_i^{16}\|_2^2$$

of the reconstruction error of the sparse signal in the training data set, wherein N is the number of sparse signals in the training data set, $\hat{x}_i$ is the ith signal in the training data set, and $x_i^{16}$ is the output of the 16th block obtained by the deep neural network according to the ith signal $\hat{x}_i$ th measurement signal $b_i$.

In a numerical experiment, the present embodiment randomly generates different 500-dimensional sparse image signals ŷ for model training until the model reaches a convergence condition, and randomly generates 1000 different 500-dimensional sparse image signals ŷ' for model testing. For each sparse signal ŷ and ŷ', using a Gaussian random matrix Φ with dimensions of (250, 500) as a sampling matrix to obtain a measurement signal b and b'; when it is sparse image signal, the dictionary D is made equal to the identity matrix, and then the image signal ŷ is equal to the sparse signal x̂, and ŷ' is equal to x̂'. Each corresponding sparse signal x̂ and measurement signal b are taken as a training sample pair (b, x̂) for training the network model, and each corresponding sparse signal x̂' and measurement signal b' are taken as a test sample pair (b', x̂') for testing the network model. According to the sparse image reconstruction method based on deep neural network in this embodiment, a network structure is designed, and after the model is trained, measurement signals b' of 1000 sparse test signals are input into the network to obtain an output x' of the network. The normalized mean square error (NMSE) of the tested sparse signal x̂' and the output x' of the deep neural network is calculated as a performance evaluation criterion to evaluate the performance of the converged sparse signal reconstruction method based on an arbitrary neural network structure of the present embodiment.

This embodiment compares three other sparse signal reconstruction methods based on the expansion of an iterative soft shrinkage thresholding algorithm, the LISTA-CP and LISTA-CPSS methods proposed in "Theoretical Linear Convergence of Unfolded ISTA and Its Practical Weights and Thresholds" published in Conference and Workshop on Neural Information Processing Systems (NeurIPS) conference in 2018, and ALISTA method proposed in "ALISTA: Analytic weights are as good as learned weights in LISTA" published in International Conference on Learning Representations (ICLR) conference in 2019. The comparative test results are shown in Table 1. The evaluation standard is normalized mean square error (NMSE), in dB. The lower the value, the better the effect.

Experimental results in Table 1 show that the reconstructed signal from the system of this embodiment is significantly better in reconstruction quality than the signals from the other three methods. The other three methods are all the existing differentiable deep neural network models with the guarantee of convergence, but the performance is limited because of the neural network structure introduced by the constraints. While improving the reconstruction accuracy, this embodiment can still guarantee the theoretical convergence.

$$\min_x \left\{ \frac{1}{2} \|\dot{A}x - \dot{b}\|_2^2 + \lambda \|x\|_1 \right\},$$

Where x is the reconstructed sparse signal, the linear transformation matrix $\dot{A}$ is a dictionary, i.e. $\dot{A}=D$, $\lambda$ is a parameter of the constraint regularization term, and $\|\cdot\|_1$ is the 1-norm of a vector.

S102, using a standard iterative soft shrinkage thresholding algorithm, or using a learned iterative soft shrinkage thresholding algorithm to solve the above-mentioned linear inverse problem of image denoising, establishing a convex combined differentiable deep neural network, using a training sample pair in a training data set, taking a measurement signal $\dot{b}$ as an input of the differentiable deep network model and a sparse signal $\hat{x}$ as a target of the differentiable deep network model, using the backpropagation algorithm to optimize the differentiable deep network model, obtaining x and approximating x to a sparse signal, obtaining a reconstructed image y=Dx and approximating y to a training image $\hat{y}$.

As an embodiment, S102 may include the following steps:

S1021, solving a linear optimization inverse problem using a standard iterative soft shrinkage thresholding algorithm, or using a learned iterative soft shrinkage thresholding algorithm, comprising:

using a standard iterative soft shrinkage thresholding algorithm to solve a linear inverse problem, specifically: $x^{n+1} = \text{prox}_{\|\cdot\|_1, \lambda t^n}(t^n \dot{A}^T \dot{b} + (I - t^n \dot{A}^T \dot{A})x^n)$, where $x^n$ represents the sparse signal obtained by solving the linear inverse problem at the nth iteration, $\dot{A}^T$ represents the transpose of the matrix $\dot{A}$, I represents the

TABLE 1

Comparison of LISTA-CP, LISTA-CPSS, ALISTA and the method (HLISTA) proposed in the present disclosure in NMSE (dB) on each differentiable deep network block in sparse signal reconstruction

| | Number of blocks | | | | | | | |
|---|---|---|---|---|---|---|---|---|
| | 1 | 2 | 3 | 4 | 5 | 6 | 7 | 8 |
| LISTA-CP | −3.97 | −9.34 | −10.50 | −12.33 | −16.28 | −22.35 | −26.10 | −27.63 |
| LISTA-CPSS | −4.65 | −9.25 | −11.26 | −10.39 | −15.28 | −18.22 | −18.08 | −22.53 |
| ALISTA | −3.96 | −9.54 | −10.49 | −11.83 | −18.00 | −19.53 | −20.84 | −22.89 |
| HLISTA | −7.32 | −11.73 | −14.80 | −17.35 | −19.48 | −21.54 | −23.55 | −25.90 |

| | Number of blocks | | | | | | | |
|---|---|---|---|---|---|---|---|---|
| | 9 | 10 | 11 | 12 | 13 | 14 | 15 | 16 |
| LISTA-CP | −28.91 | −31.33 | −31.88 | −32.75 | −34.33 | −35.15 | −35.93 | −36.77 |
| LISTA-CPSS | −24.28 | −27.60 | −30.25 | −33.35 | −37.85 | −42.25 | −46.96 | −50.96 |
| ALISTA | −23.34 | −23.96 | −32.24 | −36.90 | −40.85 | −44.12 | −45.22 | −48.91 |
| HLISTA | −28.28 | −31.21 | −34.54 | −38.88 | −43.99 | −50.62 | −57.97 | −66.51 |

In another embodiment, the present disclosure provides an image denoising method, which may comprise the following steps:

S100, acquiring a training image $\hat{y}$, and adding the training image $\hat{y}$ to a noise matrix to obtain a measurement signal $\dot{b}$, wherein the measurement signal $\dot{b}$ is a noisy image; decomposing the training image $\hat{y}$ into a product of a dictionary D and a sparse signal $\hat{x}$; taking each pair of sparse signal $\hat{x}$ and noisy image $\dot{b}$ as a training sample pair, establishing a training data set.

S101, under the 1-norm constraint, establishing a linear inverse problem of image denoising:

identity matrix, and $t^n$ represents the step size at the nth iteration; $\text{prox}_{\|\cdot\|_1, \lambda t^n}$ represents a proximal projection operator under the 1-norm constraint $\|\cdot\|_1$ and a hyperparameter $\lambda t^n$, specifically expressed as solving an optimization problem:

$$\text{prox}_{\|\cdot\|_1, a}(x) = \arg\min_r \left\{ \frac{1}{2} \|r - x\|_2^2 + a\|r\|_1 \right\},$$

wherein r represents a solution target in the above-mentioned optimization problem, and a represents a threshold parameter;

solving a linear inverse problem using a learned iterative soft shrinkage thresholding algorithm, specifically: $x^{n+1} = \text{prox}_{\|\cdot\|_1 \theta^n}(x^n + (W^n)^T(b - Ax^n))$, wherein $x^n$ represents a sparse signal obtained by solving a linear inverse problem at the nth iteration, $W^n$ represents a coefficient matrix obtained by training a neural network at the nth iteration, and $\theta^n$ represents a threshold parameter at the nth iteration.

S1022, initializing to obtain a sparse signal $x^0$ when there is no iteration, according to a convex combination of an iterative soft shrinkage thresholding algorithm and a deep neural network, constructing a differentiable deep network model composed of K convex combination blocks, with the n=1th iteration to the n=K th iteration of the corresponding standard or learned iterative soft shrinkage thresholding algorithm. The output $x^{n-1}$ of the n−1th block is taken as an input to the nth block, and a corresponding output $x^n$, n=1, . . . , K of the nth block is obtained after updating via convex combination block.

In the process, the fact that the output $x^{n-1}$ of the n−1th block is taken as an input to the nth block, and a corresponding output $x^n$, n=1, . . . , K of the nth block is obtained after updating via convex combination block comprises the following steps:

S10221, first proximal projection: inputting $x^{n-1}$, solving on the basis of a standard or learned iterative soft shrinkage thresholding algorithm, and outputting a first proximal projection $v^n$, when it is based on the standard iterative soft shrinkage thresholding algorithm, the calculation step being $v^n = \text{prox}_{\|\cdot\|_1 \lambda^n t^n}[t^n A^T b + (I - t^n A^T A) x^{n-1}]$, wherein $\lambda^n$ and $t^n$ respectively represent the parameters and the step size of the constraint regularization term obtained by neural network training in the nth iteration; when it is based on the iterative soft shrinkage thresholding algorithm, the calculation step is $v^n = \text{prox}_{\|\cdot\|_1 \theta_1^n}[x^{n-1} + (W_1^n)^T(b - Ax^{n-1})]$, where $W_1^n$ represents the coefficient matrix that needs to be trained via the neural network at the nth iteration.

S10222, deep neural network mapping: inputting a first proximal projection $v^n$, performing mapping via a deep neural network, and outputting $u^n$, wherein the calculation step is $u^n = \mathcal{N}_{P^n}(v^n)$, $\mathcal{N}_{P^n}$ representing the deep neural network introduced in the nth iteration, and $P^n$ representing network parameters which need to be obtained by neural network training.

As a preferred embodiment, the structure of the deep neural network in S10222 is the same in each convex combination block, and any composition structure can be applied, including but not limited to a convolution layer, a full connection layer, a non-linear activation layer, a pooling layer, a batch normalization layer, a skip layer connection, etc. The learnable parameters are obtained by learning the mean square error of the sparse signal reconstruction minimized by the back-propagation algorithm, which can accelerate the convergence of the algorithm, so that the algorithm can achieve the same accuracy with less time complexity and computational complexity compared with the traditional or learned iterative soft shrinkage thresholding algorithm.

S10223, second proximal projection: inputting $u^n$, solving on the basis of a standard or learned iterative soft shrinkage thresholding algorithm, and outputting a second proximal projection $w^n$, when it is based on standard iterative soft shrinkage thresholding algorithm, the calculation step is $w^n = \text{prox}_{\|\cdot\|_1 \lambda^n t^n}[t^n A^T b + (I - t^n A^T A) u^n]$, and when it is based on the learned iterative soft shrinkage thresholding algorithm, the calculation step is $w^n = \text{prox}_{\|\cdot\|_1 \theta_2^n}[u^n + (W_2^n)^T(b - Au^n)]$, where $W_2^n$ represents the coefficient matrix that needs to be trained via the neural network at the nth iteration.

S10224, convex combination calculation: inputting the first proximal projection $v^n$ and the second proximal projection $w^n$, and outputting the result $x^n$ of the nth iteration, wherein the calculation step is $x^n = \alpha^n v^n + (1 - \alpha^n) w^n$, and $\alpha^n$ is a convex combination parameter of either 0 or 1 which needs to be trained via a neural network.

S1023, using the training sample pair $(\dot{b}, \hat{x})$ in the training data set, taking the measurement signal $\dot{b}$ as the input of the differentiable deep network model, taking the sparse signal $\hat{x}$ as the target of the differentiable deep network model, and taking the output $x^K$ of the Kth block as the solution to obtain x, using the reverse gradient propagation algorithm to optimize the loss function of the differentiable deep network model so as to approximate $x^K$ to the target signal $\hat{x}$. The loss function of the differentiable deep network model is defined as the mean square error $$L_{MSE} = \frac{1}{N} \sum_{i=1}^{N} \|\hat{x}_i - x_i^K\|_2^2$$

of the reconstruction error of the sparse signal in the training data set, wherein N is the number of sparse signals in the training data set, $\hat{x}_i$ is the ith signal in the training data set, and $x_i^K$ is the output of the deep neural network and the $\hat{x}_i$th block corresponding to $\hat{x}_i$.

In this specific application example, de-Gaussian noise of natural images is achieved, and a comparison is made with ALISTA method proposed in "ALISTA: Analytic weights are as good as learned weights in LISTA", International Conference on Learning Representations, 2019. The evaluation criterion is the peak signal-to-noise ratio (PSNR) in dB. The experimental results show that the PSNR of the natural image reconstructed by the system in this embodiment is about 1 dB higher than that by the ALISTA method under the experimental condition that the SNR of Gaussian noise is 30 dB, i.e. the system in this embodiment is better than the ALISTA method in removing Gaussian noise.

In another embodiment of the present disclosure, there is also provided a compressed sensing image reconstruction method, which may comprise the following steps:

S200, acquiring a training image $\hat{y}$, multiplying the training image $\hat{y}$ by a random sampling matrix $\hat{\Phi}$ to obtain a measurement signal $\hat{b} = \hat{\Phi}\hat{y}$, wherein the measurement signal $\hat{b}$ is a sampling value, the training image $\hat{y}$ is decomposed into the product of dictionary and sparse signal, and each pair of sparse signal $\hat{x}$ and sampling value $\hat{b}$ is taken as a training sample pair to establish a training data set.

S201, under the 1-norm constraint, establishing a linear inverse problem for compressed sensing image reconstruction:

$$\min_{x}\left\{\frac{1}{2}\|\hat{A}x - \hat{b}\|_2^2 + \lambda\|x\|_1\right\},$$

where x is the reconstructed sparse signal, and the linear transformation matrix $\hat{A}$ is a product of a random sampling matrix $\hat{\Phi}$ and a dictionary D, i.e. $\hat{A} = \hat{\Phi}D$, $\lambda$ is a parameter of a constraint regularization term, and $\|\cdot\|_1$ is the 1-norm of a vector.

S202, using a standard iterative soft shrinkage thresholding algorithm, or using a learned iterative soft shrinkage thresholding algorithm to solve the above-mentioned linear inverse problem of compressed sensing image reconstruction, establishing differentiable deep neural network of a convex combination, using a training sample pair in a training data set, taking a measurement signal $\hat{b}$ as an input of the differentiable deep network model and a sparse signal $\hat{x}$ as a target of the differentiable deep network model, and using the backpropagation algorithm to optimize the differentiable deep network model, obtaining x and approximating x to the sparse signal $\hat{x}$, obtaining a reconstructed image y=Dx and approximating y to a training image $\hat{y}$.

As an example, S202 may include the following steps:

S2021, solving the linear optimization inverse problem using a standard iterative soft shrinkage thresholding algorithm or using a learned iterative soft shrinkage thresholding algorithm comprises:

using a standard iterative soft shrinkage thresholding algorithm to solve a linear inverse problem specifically being: $x^{n+1} = \text{prox}_{\|\cdot\|_1 \lambda t^n}(t^n \hat{A}^T \hat{b} + (I - t^n \hat{A}^T \hat{A}) x^n)$, where $x^n$ represents the sparse signal obtained by solving the linear inverse problem at the $x^n$th iteration, $\hat{A}^T$ represents the transpose of the matrix $\hat{A}$, I represents the identity matrix, and $t^n$ represents the step size at the nth iteration; $\text{prox}_{\|\cdot\|_1 \lambda t^n}$ represents a proximal projection operator under the 1-norm constraint $\|\cdot\|_1$ and a hyperparameter $\lambda t^n$, specifically expressed as solving an optimization problem:

$$\text{prox}_{\|\cdot\|_1 a}(x) = \underset{r}{\text{argmin}} \left\{ \frac{1}{2} \|r - x\|_2^2 + a \|r\|_1 \right\},$$

wherein r represents a solution target in the above-mentioned optimization problem, and a represents a threshold parameter;

solving the linear inverse problem using a learned iterative soft shrinkage thresholding algorithm specifically being: $x^{n+1} = \text{prox}_{\|\cdot\|_1 \theta^n}(x^n + (W^n)^T(\hat{b} - \hat{A}x^n))$, wherein $x^n$ represents a sparse signal obtained by solving a linear inverse problem at the nth iteration, $W^n$ represents a coefficient matrix obtained by training a neural network at the nth iteration, and $\theta^n$ represents a threshold parameter at the nth iteration.

S2022, initializing to obtain a sparse signal $x^0$ when there is no iteration, according to a convex combination of the iterative soft shrinkage thresholding algorithm and the deep neural network, constructing a differentiable deep network model composed of K convex combination blocks, with the n=1th iteration to the n=K th iteration of the corresponding standard or learned iterative soft shrinkage thresholding algorithm. The output $x^{n-1}$ of the n−1th block is taken as an input to the nth block, and a corresponding output $x^n$, n=1, ..., K of the nth block and obtained after updating via the convex combination block.

In the process, taking the output $x^{n-1}$ of the n−1th block as an input to the nth block, and obtaining the output $x^n$ of the nth block via convex combination block after updating m may comprise the following steps:

S20221, first proximal projection: inputting $x^{n-1}$, solving based on a standard or learned iterative soft shrinkage thresholding algorithm, and outputting a first proximal projection $v^n$; when it is based on the standard iterative soft shrinkage thresholding algorithm, the calculation step being $v^n = \text{prox}_{\|\cdot\|_1 \lambda^n t^n}[t^n \hat{A}^T \hat{b} + (I - t^n \hat{A}^T \hat{A}) x^{n-1}]$: where $\lambda^n$ and $t^n$ respectively represent the parameter and the step size of the constraint regularization term obtained by neural network training in the nth iteration; and when it is based on the learned iterative soft shrinkage thresholding algorithm, the calculation step being $v^n = \text{prox}_{\|\cdot\|_1 \theta_1^n}[x^{n-1} + (W_1^n)^T(\hat{b} - \hat{A}x^{n-1})]$, where $W_1^n$ represents the coefficient matrix that needs to be obtained by neural network training at the nth iteration.

S20222, deep neural network napping: inputting a first proximal projection $v^n$, performing mapping via a deep neural network, and outputting $u^n$, where the calculation step is $u^n = \mathcal{N}_{P^n}(v^n)$: $\mathcal{N}_{P^n}$ representing the deep neural network introduced in the nth iteration, and $P^n$ representing network parameters which need to be obtained by neural network training.

As a preferred embodiment, the structure of the deep neural network in S20222 is the same in each convex combination block, and any composition structure can be applied, including but not limited to a convolution layer, a full connection layer, a non-linear activation layer, a pooling layer, a batch normalization layer, a skip layer connection, etc. The learnable parameters are obtained by learning the mean square error of the sparse signal reconstruction minimized by the back-propagation algorithm, which can accelerate the convergence of the algorithm, so that the algorithm can achieve the same accuracy with less time complexity and computational complexity compared with the traditional or learned iterative soft shrinkage thresholding algorithm.

S20223, second proximal projection: inputting $u^n$, solving based on a standard or learned iterative soft shrinkage thresholding algorithm, and outputting $w^n$ a second proximal projection; when it is based on standard iterative soft shrinkage thresholding algorithm, the calculation step being $w^n = \text{prox}_{\|\cdot\|_1 \lambda^n t^n}[t^n \hat{A}^T \hat{b} + (I - t^n \hat{A}^T \hat{A}) u^n]$; and when it is based on the learned iterative soft shrinkage thresholding algorithm, the calculation step being $w^n = \text{prox}_{\|\cdot\|_1 \theta_2^n}[u^n + (W_2^n)^T(\hat{b} - \hat{A}u^n)]$, where $W_2^n$ represents the coefficient matrix that needs to be obtained via neural network training at the nth iteration.

S20224, convex combination calculation: inputting the first proximal projection $v^n$ and the second proximal projection $w^n$, and outputting the result $x^n$ of the nth iteration, wherein the calculation step is $x^n = \alpha^n v^n + (1 - \alpha^n) w^n$, and is between $\alpha^n$ is a convex combination parameter of either 0 or 1 which needs to be obtained via neural network training.

S2023, using the training sample pair $(\hat{b}, \hat{x})$ in the training data set, taking the measurement signal $\hat{b}$ as the input of the differentiable deep network model, taking the sparse signal $\hat{x}$ as the target of the differentiable deep network model, and taking the output $x^K$ of the K th block as the x obtained via solution, using a reverse gradient propagation algorithm to optimize the loss function of the differentiable deep network model so as to approximate $x^K$ to the target signal $\hat{x}$. The loss function of the differentiable deep network model is defined as the mean square error $$L_{MSE} = \frac{1}{N} \sum_{i=1}^{N} \|\hat{x}_i - x_i^K\|_2^2$$

of the reconstruction error of the sparse signal in the training data set, wherein N is the number of sparse signals in the training data set, $\hat{x}_i$ is the i th signal in the training data set, and $x_i^K$ is the output of the K th block, corresponding to $\hat{x}_i$, of the deep neural network.

In this specific application example, the compressed sensing reconstruction of natural images is realized, and three other sparse signal reconstruction methods based on the expansion of iterative soft shrinkage thresholding algorithm are compared, namely, the LISTA-CP and LISTA-CPSS methods proposed in "Theoretical Linear Convergence of Unfolded ISTA and Its Practical Weights and Thresholds" published at the Conference and Workshop on Neural Information Processing Systems (NeurIPS) conference in 2018 and ALISTA method proposed in "ALISTA: Analytic weights are as good as learned weights in LISTA" published in International Conference on Learning Representations conference in 2019. The evaluation criterion is the peak signal-to-noise ratio (PSNR) in dB. The experimental results show that the PSNR of the natural image reconstructed by the system of this embodiment is 0.95, 0.90 and 0.98 dB higher than that of the natural image reconstructed by the LISTA-CP method, the LISTA-CPSS method and the ALISTA method, respectively, at the sampling rate of 50%.

In another embodiment of the present disclosure, there is also provided an image restoration method, which may comprise the steps of:

S300, acquiring a training image $\hat{y}$ multiplying the training image $\hat{y}$ by a 0-1 diagonal sampling matrix $\tilde{\Phi}$ to obtain a measurement signal $\tilde{b}=\tilde{\Phi}\hat{y}$, wherein the measurement signal is an image to be restored by a lost pixel point, the 0-1 diagonal sampling matrix $\tilde{\Phi}$ is a diagonal matrix, and the diagonal element is either 0 or 1; decomposing the training image $\hat{y}$ into a product of a dictionary D and a sparse signal $\hat{x}$; establishing the training data set by taking each pair of sparse signal $\hat{x}$ and the image $\tilde{b}$ with missing pixels to be restored as a training sample pair.

S301, under the 1-norm constraint, establishing a linear inverse problem of image restoration:

$$\min_x \left\{ \frac{1}{2} \|\tilde{A}x - \tilde{b}\|_2^2 + \lambda \|x\|_1 \right\},$$

where the sparse signal x is reconstructed, and the linear transformation matrix $\tilde{A}$ is a product of a 0-1 diagonal sampling matrix $\tilde{\Phi}$ and a dictionary D, namely $\tilde{A}=\tilde{\Phi}D$, $\lambda$ is a parameter of a constraint regularization term, and $\|\cdot\|_1$ is the 1-norm of a vector.

S302, using a standard iterative soft shrinkage thresholding algorithm or using a learned iterative soft shrinkage thresholding algorithm to solve the above-mentioned linear inverse problem of image restoration, establishing a differentiable deep neural network of convex combination, using a training sample pair in a training data set, taking a measurement signal $\tilde{b}$ as an input of the differentiable deep network model and a sparse signal $\hat{x}$ as a target of the differentiable deep network model, using the backpropagation algorithm to optimize the differentiable deep network model, obtaining x and approximating x to a sparse signal $\hat{x}$, obtaining a reconstructed image y=Dx and approximating y to a training image $\hat{y}$.

As an embodiment, S302 may include the following steps:

S3021, solving a linear optimization inverse problem using a standard iterative soft shrinkage thresholding algorithm or using a learned iterative soft shrinkage thresholding algorithm, comprising:

S30211, solving the linear inverse problem using a standard iterative soft shrinkage thresholding algorithm, specifically being $x^{n+1}=\text{prox}_{\|\cdot\|_1,\lambda t^n}(t^n\tilde{A}^T\tilde{b}+(I-t^n\tilde{A}^T\tilde{A})x^n)$, wherein $x^n$ represents the sparse signal obtained by solving the linear inverse problem at the nth iteration, $\tilde{A}^T$ represents the transpose of the matrix $\tilde{A}$, I represents the identity matrix, and $t^n$ represents the step size at the nth iteration; $\text{prox}_{\|\cdot\|_1,\lambda t^n}$ represents a proximal projection operator under the 1-norm constraint $\|\cdot\|_1$ and a hyperparameter $\lambda t^n$, specifically expressed as solving an optimization problem:

$$\text{prox}_{\|\cdot\|_1,a}(x) = \arg\min_r \left\{ \frac{1}{2}\|r - x\|_2^2 + a\|r\|_1 \right\},$$

wherein r represents a solution target in the above-mentioned optimization problem, and a represents a threshold parameter;

S30212, solving a linear inverse problem using a learned iterative soft shrinkage thresholding algorithm, specifically being $x^{n+1}=\text{prox}_{\|\cdot\|_1,\theta^n}(x^n+(W^n)^T(\tilde{b}-\tilde{A}x^n))$, wherein $x^n$ represents a sparse signal obtained by solving the linear inverse problem at the n th iteration, $W^n$ represents a coefficient matrix obtained by neural network training at the n th iteration, and $\theta^n$ represents a threshold parameter at the nth iteration.

S3022, initializing to obtain the sparse signal $x^0$ when there is no iteration, according to a convex combination of the iterative soft shrinkage thresholding algorithm and the deep neural network, constructing a differentiable deep network model composed of K convex combination blocks, with the n=1th iteration to the n=K th iteration of respective corresponding standard or learned iterative soft shrinkage thresholding algorithm. The output $x^{n-1}$ of the n−1th block is taken as an input to the nth block, and a corresponding output $x^n$, n=1, ..., K of the nth block is obtained via a convex combination block after updating.

The fact that the output $x^{n-1}$ of the n−1th block is taken as an input to the nth block, and a corresponding output $x^n$, n=1, ..., K of the nth block is obtained via a convex combination block after updating may comprise the following steps:

S30221, first proximal projection: inputting $x^{n-1}$, solving on the basis of a standard or learned iterative soft shrinkage thresholding algorithm, and outputting a first proximal projection $x^{n-1}$; when it is based on the standard iterative soft shrinkage thresholding algorithm, the calculation step being $v^n=\text{prox}_{\|\cdot\|_1,\lambda^n t^n}[t^n\tilde{A}^T\tilde{b}+(I-t^n\tilde{A}^T\tilde{A})x^{n-1}]$, where $\lambda^n$ and $t^n$ respectively represent the parameter and the step size of the constraint regularization term obtained by neural network training in the nth iteration; and when it is based on the learned iterative soft shrinkage thresholding algorithm, the calculation step being $v^n=\text{prox}_{\|\cdot\|_1,\theta^n}[x^{n-1}+(W_1^n)^T(\tilde{b}-\tilde{A}x^{n-1})]$, where $W_1^n$ represents the coefficient matrix that needs to be obtained by the neural network training at the nth iteration.

S30222, deep neural network mapping: inputting a first proximal projection $v^n$, performing mapping via the deep neural network, and outputting $u^n$, the calculation step being $u^n=\mathcal{N}_{P^n}(v^n)$, $\mathcal{N}_{P^n}$ representing the deep neural network introduced in the nth iteration, and $P^n$ representing network parameters which need to be obtained by neural network training.

As a preferred embodiment, the structure of the deep neural network in S30222 is the same in each convex combination block, and any composition structure can be applied, including but not limited to a convolution layer, a full connection layer, a non-linear activation layer, a pooling layer, a batch normalization layer, a skip layer connection, etc. The learnable parameters are obtained by learning the mean square error of the sparse signal reconstruction minimized by the back-propagation algorithm, which can accelerate the convergence of the algorithm, so that the algorithm can achieve the same accuracy with less time complexity and computational complexity compared with the traditional or learned iterative soft shrinkage thresholding algorithm.

S30223, second proximal projection: inputting $u^n$, solving based on a standard or learned iterative soft shrinkage thresholding algorithm, and outputting a second proximal projection $w^n$; when it is based on the standard iterative soft shrinkage thresholding algorithm, the calculation step being $w^n = \text{prox}_{\|\cdot\|_1 \lambda^n t^n}[t^n \tilde{A}^T \tilde{b} + (I - t^n \tilde{A}^T \tilde{A}) u^n]$; and when it is based on the learned iterative soft shrinkage thresholding algorithm, the calculation step being $w^n = \text{prox}_{\|\cdot\|_1 \theta_2^n}[u^n + (W_2^n)^T (\tilde{b} - \tilde{A} u^n)]$, where $W_2^n$ represents the coefficient matrix that needs to be obtained via the neural network training at the nth iteration.

S30224, convex combination calculation: inputting the first proximal projection $v^n$ and the second proximal projection $w^n$, and outputting the result $x^n$ of the nth iteration, the calculation step being $x^n = \alpha^n v^n + (1 - \alpha^n) w^n$, wherein $\alpha^n$ is a convex combination parameter of either 0 or 1 that needs to be obtained via the neural network training.

S3023, using the training sample pair $(\tilde{b}, \hat{x})$ in the training data set, taking the measurement signal $\tilde{b}$ as the input of the differentiable deep network model, taking the sparse signal $\hat{x}$ as the target of the differentiable deep network model, and taking the output $x^K$ of the K th block as the x obtained via solution, using a reverse gradient propagation algorithm to optimize the loss function of the differentiable deep network model so as to approximate $x^K$ to the target signal $\hat{x}$. The loss function of the differentiable deep network model is defined as the mean square error $$L_{MSE} = \frac{1}{N} \sum_{i=1}^{N} \|\hat{x}_i - x_i^K\|_2^2$$

of the reconstruction error of the sparse signal in the training data set, wherein N is the number of sparse signals in the training data set, $\hat{x}_i$ is the i th signal in the training data set, and $x_i^K$ is the output of the K th block, corresponding to $\hat{x}_i$, of the deep neural network.

In this specific application example, the restoration of medical magnetic resonance images is achieved, and a comparison is made to the ISTA-Net method proposed in "ISTA-Net: Interpretable Optimization-Inspired Deep Network for Image Compressive Sensin" published in IEEE Conference on Computer Vision and Pattern Recognition (CVPR) conference in 2018. The evaluation criterion is the peak signal-to-noise ratio (PSNR) in dB. The experimental results show that the PSNR of the medical image reconstructed by the system of this embodiment is about 1.5 dB higher than the medical image obtained by the ISTA-Net method under the experimental condition that the percentage of lost pixels is 20%.

On the basis of the same technical concept mentioned above, in another embodiment of the present disclosure, an image processing system is provided for implementing the image processing method in the above-mentioned embodiment, and achieving the purposes of sparse image reconstruction, image denoising, compressed sensing image reconstruction or image restoration. Specifically, the image processing system comprises:

a training data set establishment module: acquiring a training image, processing the training image to obtain a measurement signal; decomposing the training image into a product of a dictionary and a sparse signal, taking the measurement signal and the sparse signal as a training sample pair, and establishing a training data set;

a differentiable deep neural network establishment module: under the 1-norm constraint, establishing a linear inverse problem of image processing, and using the iterative soft shrinkage thresholding algorithm to solve the linear inverse problem, according to the convex combination of iterative soft shrinkage thresholding algorithm and deep neural network, establishing the differentiable deep neural network with convex combination;

a processing module: using the training sample pair in the training data set, taking the measurement signal as the input of the differentiable deep network model, taking the sparse signal as the target of the differentiable deep network model, using the reverse gradient propagation algorithm to optimize the differentiable deep network model, obtaining the reconstructed sparse signal, and approximating the reconstructed sparse signal to the sparse signal to obtain the final image, the final image being the product of the dictionary and the reconstructed sparse signal, and approximating the final image to the training image.

The present disclosure also provides, in another embodiment, an image processing device comprising a memory, a processor and a computer program stored on the memory and executable on the processor, the processor when executing the program being operable to perform the method of any of the embodiments described above.

Optionally, the memory is used for storing the program; the memory may include volatile memory, e.g. random access memory (RAM), such as static random access memory (SRAM), double data rate synchronous dynamic random access memory (DDR SDRAM) and the like; the memory may also comprise a non-volatile memory such as flash memory. The memory is used to store computer programs (e.g. application programs, functional modules, etc. implementing the methods described above), computer instructions, etc. which may be stored in one or more memory partitions. The computer programs, computer instructions, data, etc. described above may be invoked by a processor.

The computer programs, computer instructions, etc. described above may be stored in one or more memory partitions. Also, the computer programs, computer instructions, data, etc. described above may be invoked by a processor.

A processor for executing a computer program stored in a memory to implement the steps of the method according to the above-mentioned embodiments. Reference is made in detail to the foregoing description of the process embodiments.

The processor and memory may be separate structures or an integral structure to be integrated together. When the processor and the memory are separate structures, the memory and the processor may be coupled via a bus.

In one embodiment of the present disclosure, there is provided a computer readable storage medium having stored thereon a computer program which, when executed by a processor, is operable to perform the image processing method of any one of the embodiments described above.

In an embodiment of the disclosure, there is also provided a computer program product comprising a non-transitory computer readable storage medium storing a computer program operable to cause a computer to perform the image processing method.

There is also provided, in an embodiment of the disclosure, a chip system comprising a processor coupled to a memory, the memory storing program instructions for implementing the image processing method when the program instructions stored in the memory are executed by the processor.

In an embodiment of the disclosure, there is also provided a computer apparatus comprising: a communication interface, a memory, and a processor, wherein the memory is configured for storing a program for implementing the image processing method in any one of the above embodiments; the processor is configured to load and execute the memory-stored program to implement the steps of the image processing method in any of the embodiments described above.

The number of the communication interfaces, the memory and the processor may be at least one, and the communication interfaces, the memory and the processor may communicate with each other via a communication bus. The communication interface may be used to receive data transmitted by other devices, may include an interface through which a computer apparatus communicates with other devices, or may include a communication interface used by various components within the computer apparatus to communicate. A detailed description of the processor and memory may refer to the foregoing embodiments and will not be described again.

In practice, the computer apparatus may be a server, a computer, etc. Therefore, the structural composition of the computer apparatus is not limited to a communication interface, a memory and a processor, and may also include other hardware devices, such as other storage devices and the like, which may be determined according to the functions possessed by the computer apparatus.

The image processing method, system, device and readable medium provided by the present disclosure can guarantee the reconstruction accuracy compared with the standard deep neural network, and at the same time, can theoretically prove the convergence from the perspective of optimization. Compared with the existing differentiable deep neural network, the present disclosure guarantees the convergence and has higher reconstruction accuracy without restricting the introduced neural network structure. Compared with the traditional iterative optimization algorithm, the algorithm speed and reconstruction accuracy are improved. The reconstruction method can be applied to general linear inverse problem solving, and also can be applied to relevant actual scenes, such as image denoising, compressed sensing, image restoration, etc.

It should be noted that the steps in the method provided by the present disclosure can be implemented by using corresponding modules, devices, units and the like in the system, and a person skilled in the art would have been able to implement the composition of the system by referring to the technical solutions of the method, namely, the embodiments in the method can be understood as preferred embodiments for constructing the system, which will not be described in detail herein.

Those skilled in the art will appreciate that, in addition to the system and its various device provided by the present disclosure being implemented as purely computer readable program code, the system and its various device provided by the present disclosure may well be implemented in the form of logic gates, switches, application specific integrated circuits, programmable logic controllers, embedded microcontrollers, etc. by logically programming the method steps. Therefore, the system and various devices provided by the present disclosure can be considered as a hardware component, and the devices included therein for implementing various functions can also be considered as structures within the hardware component. Means for performing the functions may both be implemented in software modules or in hardware components.

Various embodiments are described in this specification in a progressive manner, with each embodiment focusing on differences from the other embodiments, with like parts referring to each other. The system, device, and computer apparatus disclosed in the embodiments are relatively simple to describe because they correspond to the methods disclosed in the embodiments, as described in the methods section.

Specific embodiments of the disclosure have been described above. It is to be understood that the present disclosure is not limited to the specific embodiments described above, and that various changes and modifications within the scope of the claims may be made by those skilled in the art without affecting the spirit of the present disclosure.

What is claimed is:

1. An image processing method for sparse image reconstruction, image denoising, compressed sensing image reconstruction or image restoration, comprising:
    acquiring a training image, and processing the training image to obtain a measurement signal;
    decomposing the training image into a product of a dictionary and a sparse signal, using the measurement signal and the sparse signal as a training sample pair to establish a training data set;
    establishing a linear inverse problem of image processing under a 1-norm constraint; solving the linear inverse problem by using an iterative soft shrinkage thresholding algorithm, and establishing a differentiable deep neural network for a convex combination of the iterative soft shrinkage thresholding algorithm and the deep neural network; and
    using the training sample pair in the training data set, taking the measurement signal as an input of the differentiable deep network model, taking the sparse signal as a target of the differentiable deep network model, and using a backpropagation algorithm to optimize the differentiable deep network model to obtain a reconstructed sparse signal; approximating the reconstructed sparse signal to the sparse signal to obtain a final image, wherein the final image is a product of the dictionary and the reconstructed sparse signal; and approximating the final image to the training image.

2. The image processing method according to claim 1, wherein processing the training image to obtain a measurement signal comprises any one of the following:
    acquiring a training image $\hat{y}$, and sampling the training image $\hat{y}$ by a sampling matrix $\Phi$ to obtain the measurement signal $b=\Phi\hat{y}$ when the image processing is sparse image reconstruction;
    acquiring a training image $\hat{y}$, and adding the training image $\hat{y}$ to a noise matrix to obtain a measurement signal $b$ when the image processing is image denoising, the measurement signal $b$ being a noisy image;
    acquiring a training image $\hat{y}$, and multiplying the training image $\hat{y}$ by a random sampling matrix $\Phi$ to obtain a measurement signal $\hat{b}=\Phi\hat{y}$ when the image processing is compressed sensing image reconstruction, the measurement signal $\hat{b}$ being a sampling value; and
    acquiring a training image $\hat{y}$, and multiplying the training image $\hat{y}$ by a 0-1 diagonal sampling matrix $\Phi$ to obtain a measurement signal $\tilde{b}=\tilde{\Phi}\hat{y}$ when the image processing is image restoration, the measurement signal being an image to be restored by a missing pixel point, and the 0-1 diagonal sampling matrix $\tilde{\Phi}$ being a diagonal matrix, and the diagonal element being either 0 or 1.

3. The image processing method according to claim 2, wherein the establishing a linear inverse problem of image processing under the 1-norm constraint comprises any one of the following:
under the 1-norm regularization constraint of a reconstructed sparse signal x, establishing a general linear optimization inverse problem when the image processing is sparse image reconstruction:

$$\min_x F(x) = \min_x \left\{ \frac{1}{2}\|Ax - b\|_2^2 + \lambda\|x\|_1 \right\},$$

x being a reconstructed sparse signal, A=ΦD being a linear transformation matrix, Φ being a sampling matrix, D being a dictionary, λ being a parameter of a constraint regularization term, and $\|\cdot\|_1$ being the 1-norm of a vector;
under the 1-norm constraint, establishing a linear inverse problem of image denoising when the image processing is image denoising:

$$\min_x \left\{ \frac{1}{2}\|\dot{A}x - \dot{b}\|_2^2 + \lambda\|x\|_1 \right\},$$

x being the reconstructed sparse signal, and linear transformation matrix Ȧ being the dictionary D, namely Ȧ=D, λ being a parameter of the constraint regularization term, and $\|\cdot\|_1$ being the 1-norm of a vector;
under the 1-norm constraint, establishing the linear inverse problem of compressed sensing image reconstruction when the image processing is compressed sensing image reconstruction:

$$\min_x \left\{ \frac{1}{2}\|\hat{A}x - \hat{b}\|_2^2 + \lambda\|x\|_1 \right\},$$

x being the reconstructed sparse signal, and the linear transformation matrix Â being a product of a random sampling matrix $\hat{\Phi}$ and a dictionary D, namely Â=$\hat{\Phi}$D, λ being a parameter of a constraint regularization term and $\|\cdot\|_1$ being the 1-norm of a vector; and
under the 1-norm constraint, establishing the linear inverse problem of image restoration when the image processing is image restoration:

$$\min_x \left\{ \frac{1}{2}\|\tilde{A}x - \tilde{b}\|_2^2 + \lambda\|x\|_1 \right\},$$

x being the reconstructed sparse signal, and the linear transformation matrix Ã being a product of a 0-1 diagonal sampling matrix $\tilde{\Phi}$ and a dictionary D, namely Ã=$\tilde{\Phi}$D, λ being a parameter of a constraint regularization term, and $\|\cdot\|_1$ being the 1-norm of a vector.

4. The image processing method according to claim 1, wherein the solving the linear inverse problem by using an iterative soft shrinkage thresholding algorithm comprises solving the linear inverse problem using a standard iterative soft shrinkage thresholding algorithm or solving the linear inverse problem using a learned iterative soft shrinkage thresholding algorithm,
the solving the linear inverse problem using a standard iterative soft shrinkage thresholding algorithm specifically being: $x^{n+1}=\text{prox}_{\|\cdot\|_1,\lambda t^n}(t^n A^T b + (I - t^n A^T A)x^n)$, $x^n$ representing a sparse signal obtained by solving the linear inverse problem at nth iteration, $A^T$ representing a transpose of a matrix A, I representing an identity matrix, and $t^n$ representing a step size at n th iteration; $\text{prox}_{\|\cdot\|_1,\lambda t^n}$ representing a proximal projection operator under the 1-norm constraint $\|\cdot\|_1$ and a hyperparameter $\lambda t^n$, specifically expressed as solving an optimization problem:

$$\text{prox}_{\|\cdot\|_1,a}(x) = \arg\min_r \left\{ \frac{1}{2}\|r - x\|_2^2 + a\|r\|_1 \right\},$$

r being an objective variable for solving the optimization problem represented by the proximal projection operator, a being a threshold parameter; and
the solving the linear inverse problem using a learned iterative soft shrinkage thresholding algorithm specifically being: $x^{n+1}=\text{prox}_{\|\cdot\|_1,\theta^n}(x^n + (W^n)^T(b - Ax^n))$, $x^n$ representing a reconstructed sparse signal obtained by solving the linear inverse problem at nth iteration, $W^n$ representing a coefficient matrix obtained by training a neural network at nth iteration, and $\theta^n$ representing a threshold parameter at nth iteration.

5. The image processing method according to claim 1, wherein the establishing a differentiable deep network model for a convex combination comprises:
initializing to obtain a sparse signal $x^0$ when there is no iteration, according to a convex combination of an iterative soft shrinkage thresholding algorithm and a deep neural network, constructing a differentiable deep network model composed of K convex combination blocks, respectively corresponding to the n=1th iteration to n=K th iteration of the iterative soft shrinkage thresholding algorithm, taking an output $x^{n-1}$ of the n−1th block as an input to the nth block, and updating and obtaining an output $x^n$, n=1, . . . , K corresponding to the nth block via the convex combination block.

6. The image processing method according to claim 5, wherein a loss function of the differentiable deep network model is defined as a mean square error $L_{MSE}$ of a sparse signal reconstruction error in the training data set:

$$L_{MSE} = \frac{1}{N}\sum_{i=1}^{N}\|\hat{x}_i - x_i\|_2^2;$$

N being a number of sparse signals in the training data set, $\hat{x}_i$ being ith signal in the training data set, $\hat{x}_i$ being the reconstructed sparse signal obtained from a measurement signal $b_i$ of ith signal $\hat{x}_i$ by the deep neural network.

7. The image processing method according to claim 5, wherein the taking an output $x^{n-1}$ of the n−1th block as an input to the nth block, and updating and obtaining an output $x^n$ corresponding to the nth block via the convex combination block comprises:

first proximal projection: salving on the basis of the iterative soft shrinkage thresholding algorithm and outputting a first proximal projection $v^n$ according to the input $x^{n-1}$;

deep neural network mapping: inputting the first proximal projection $v^n$, performing mapping via the deep neural network, outputting $u^n$, and calculating as $u^n = \mathcal{N}_{P^n}(v^n)$, $\mathcal{N}_{P^n}$ representing the deep neural network introduced during nth iteration, and $P^n$ representing a network parameter which needs to be obtained by neural network training;

second proximal projection: solving on the basis of the iterative soft shrinkage thresholding algorithm and outputting the second proximal projection $w^n$ according to the input $u^n$; and convex combination calculation: inputting the first proximal projection $v^n$ and the second proximal projection $w^n$, and outputting the result $x^n$ of the nth iteration, the calculation step being $x^n = \alpha^n v^n + (1-\alpha^n) w^n$, $\alpha^n$ being a convex combination parameter between 0 and 1 which needs to be obtained by neural network training.

8. An image processing device, comprising a memory, a processor and a computer program stored on the memory and executable on the processor, wherein the processor, when executing the program, is operable to perform an image processing method according to claim 1.

9. An image processing system, comprising:

a training data set establishment module configured for acquiring a training image, and processing the training image to obtain a measurement signal; decomposing the training image into a product of a dictionary and a sparse signal, and using the measurement signal and the sparse signal as a training sample pair to establish a training data set;

a differentiable deep neural network establishment module configured for establishing a linear inverse problem of image processing under a 1-norm constraint, solving the linear inverse problem by using an iterative soft shrinkage thresholding algorithm, and establishing a differentiable deep neural network for a convex combination of the iterative soft shrinkage thresholding algorithm and the deep neural network; and a processing module configured for using the training sample pair in the training data set, taking the measurement signal as an input of the differentiable deep network model, taking the sparse signal as a target of the differentiable deep network model, and using a backpropagation algorithm to optimize the differentiable deep network model to obtain a reconstructed sparse signal; approximating the reconstructed sparse signal to the sparse signal to obtain a final image, wherein the final image is a product of the dictionary and the reconstructed sparse signal; and approximating the final image to the training image.

* * * * *